US008295859B1

(12) United States Patent
Yarkan et al.

(10) Patent No.: US 8,295,859 B1
(45) Date of Patent: Oct. 23, 2012

(54) SYSTEM AND METHOD OF EXPLOITING LOCATION AWARENESS TO IMPROVE WIRELESS COGNITIVE RADIO

(75) Inventors: Serhan Yarkan, Tampa, FL (US); Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 13/019,689

(22) Filed: Feb. 2, 2011

Related U.S. Application Data

(63) Continuation-in-part of application No. 12/018,481, filed on Jan. 23, 2008, now abandoned.

(60) Provisional application No. 60/886,180, filed on Jan. 23, 2007.

(51) Int. Cl.
*H04W 24/00* (2009.01)
(52) U.S. Cl. .............. 455/456.6; 455/456.1; 455/67.11; 455/423; 342/450
(58) Field of Classification Search .............. 455/67.1, 455/414.1, 456.1–457, 67.11–67.16, 423–425; 342/450
See application file for complete search history.

(56) References Cited

U.S. PATENT DOCUMENTS

| 7,076,246 | B2 | 7/2006 | Chitrapu |
| 7,620,404 | B2 * | 11/2009 | Chesnais et al. ........... 455/456.1 |
| 7,801,073 | B2 * | 9/2010 | Lau et al. ................... 370/328 |
| 7,917,110 | B2 * | 3/2011 | Horiguchi et al. ......... 455/164.1 |
| 7,956,807 | B1 * | 6/2011 | Celebi et al. ................. 342/450 |
| 8,019,341 | B2 * | 9/2011 | Falk et al. .................... 455/434 |
| 8,107,966 | B2 * | 1/2012 | Choi et al. ................... 455/450 |
| 8,160,599 | B2 * | 4/2012 | Stanforth et al. ............ 455/450 |
| 8,184,656 | B2 * | 5/2012 | Chandra et al. ............ 370/445 |
| 8,213,954 | B2 * | 7/2012 | Gurney et al. ............ 455/456.1 |
| 2003/0157932 | A1 * | 8/2003 | Chitrapu ..................... 455/423 |
| 2004/0242261 | A1 | 12/2004 | Fette |
| 2006/0009209 | A1 | 1/2006 | Rieser et al. |
| 2007/0142055 | A1 * | 6/2007 | Toivanen et al. ............ 455/450 |
| 2007/0259671 | A1 * | 11/2007 | Cheng et al. .............. 455/452.2 |
| 2007/0293237 | A1 * | 12/2007 | Correal et al. ............ 455/456.1 |
| 2009/0191897 | A1 * | 7/2009 | Johnson et al. .......... 455/456.3 |
| 2011/0014936 | A1 * | 1/2011 | Kim ............................ 455/509 |
| 2011/0070885 | A1 * | 3/2011 | Ruuska et al. .............. 455/434 |

OTHER PUBLICATIONS

Mitola, Joseph "Cognitive Radio an Integrated Agent Architecture for Software Defined Radio", PhD. dissertation, KTH Royal Institute of Technology, Stockholm, Sweden, May 8, 2000, pp. 32-57.*
Mitola, Cognitive Radio An Integrated Agent Architecture for Software Defined Radio, PhD. dissertation, KTH Royal Institute of Technology, Stockholm, Sweden, May 8, 2000, pp. 1-313.

(Continued)

*Primary Examiner* — Sharad Rampuria
(74) *Attorney, Agent, or Firm* — Molly L. Sauter; Smith & Hopen, P.A.

(57) ABSTRACT

The present invention provides a system and method for exploiting location awareness to improve the communication performance in a wireless cognitive radio system. The invention includes determining the absolute position information for the cognitive radio system, receiving digital topographical data related to the absolute position information, classifying the environment of the cognitive radio system based on the absolute position and the topographical data, matching the classified environment with corresponding statistical parameters and improving the communication performance of the cognitive radio system by adapting the cognitive radio system according to the corresponding statistical parameters.

19 Claims, 5 Drawing Sheets

OTHER PUBLICATIONS

Arslan, Adaptation Techniques and Enabling Parameter Estimation Algorithms for Wireless Communications Systems, Signal Processing for Mobile Communications Handbook, 2005, M. Ibnkahla, Ed., Boca Raton, FL, CRC Press, Chapter 28, pp. 1-26.

Rappaport, Mobile Radio Propagation: Small-Scale Fading and Multipath, Wireless Communications: Principles and Practice, 2nd Ed., Prentice-Hall, 2002, Chapter 4, pp. 139-196.

Andersen, Radio Channel Characterisation, European Communities Tech. Rep., 1999, pp. 27-78.

Rec. ITU-R M 1225, Guidelines for Evaluation of Radio Transmission Technologies for IMT-2000, 1997, ITU-R, Tech. Rep., pp. 1-65.

Shannon, A Mathematical Theory of Communication, The Bell System Technical Journal, 1948, vol. 27, pp. 379-423 and pp. 623-656.

Blackard et al., Measurements and Models of Radio Frequency Impulsive Noise for Indoor Wireless Communications, IEEE Journal on Selected Areas in Communications, Sep. 1993, vol. 11, No. 7, pp. 991-1001.

Blum et al., An Adaptive Spatial Diversity Receiver for Non-Gaussian Interference and Noise, IEEE Transactions on Signal Processing, 1997, pp. 385-388.

Sarkar et al., A Survey of Various Propagation Models for Mobile Communication, IEEE Antennas and Propagation Magazine, Jun. 2003, vol. 45, No. 3, pp. 51-82.

Mitola, Cognitive Radio for Flexible Mobile Multimedia Communications, IEEE International Workshop on Mobile Multimedia Communications, 1999, pp. 3-10.

Fujii et al., Ad-hoc Cognitive Radio-Development to Frequency Sharing System by Using Multi-hop Network, IEEE International Symposium on New Frontiers in Dynamic Spectrum Access Networks, 2005, pp. 589-592.

Cognitive Radio Shows Great Promise, http://www.cotsjournalonline.com/home/printthis.php?id=100206, accessed Jan. 19, 2005.

Braun et al., A Physical Mobile Radio Channel Model, IEEE Transactions on Vehicular Technology, May 1991, vol. 40, No. 2, pp. 472-482.

* cited by examiner

TABLE I
THE IMPACT OF ENVIRONMENTAL CHARACTERISTICS ON SMALL-SCALE PARAMETERS

| Parameter | Description | Illustration |
|---|---|---|
| Delay spread | In COST 207 for GSM and in its successors COST 231 [4] (and even in latter successor, COST 259), macrocell classification has four sub-classes: Typical urban, bad urban, rural area and hilly terrain. In each classification, corresponding power delay profile has some distinct differences such as number of clusters and arrival times beside a common property, which is exponentially decaying power. | |
| Doppler spread | Due to temporal variation of the wireless channel, the received signal smears in the frequency domain. The amount of this smearing is related to the speed of the mobile and/or base station or the components in between. Thus, in a building, it is expected to have narrower Doppler spread as compared to that in a rural area. Besides, being in LOS alters the power distribution of the Doppler spectrum. Again, in COST 207 for GSM and in its successors COST 231 [4], typical Doppler sceneries for macrocell communication is illustrated in the next cell. | |
| Angular spread | Depending on the richness of the scatterers in an environment, angle of arrival of multipath components vary. If the receiver is surrounded by numerous scatterers as in a typical indoor communication and the collected energy is observed, it is very likely to have a power that broadens around the mean angle of arrival. On the other hand, in an environment that does not have lots of scatterers around as in rural area, it is very likely to have a narrower power pattern around the mean angle of arrival [2]. These two cases are illustrated in the figure within the next cell. | |

*FIG. 1*

TABLE II

SOME CRUCIAL WIRELESS TRANSMISSION PARAMETERS, THEIR IMPACTS, AND RELATED ADAPTATION OPTIONS

| Parameter | Effect | How to use |
| --- | --- | --- |
| Path-loss | Received signal strength (RSS) | Link adaptation via adaptive coding/modulation<br>Handoff (handover)<br>Channel allocation<br>Interference management<br>Simple distant-based power control algorithm |
| Delay Spread | Frequency selectivity | Number of equalizer taps for single carrier systems<br>Number of pilots and spacing for multi carrier systems<br>fast Fourier transform (FFT) size for multi carrier systems<br>Carrier spacing for multi carrier systems<br>Adaptive filtering for channel estimation<br>Cyclic prefix length for multi carrier systems |
| Doppler spread | Time selectivity | Channel tracker step size<br>Interleaving schemes<br>Handoff management<br>Frequency allocation |
| Angular spread | Spatial selectivity | Beamforming<br>Smart antenna<br>Adaptive multi-input multi-output (MIMO)<br>Interference management<br>Frequency allocation |
| LOS/NLOS | Overall channel behavior | Transmission frequency<br>Power adjustment |
| Noise characteristic | Capacity | Transmission frequency<br>Link adaptation<br>Adaptive coding/modulation |

*FIG. 2*

The flow of the environmental classification algorithm for cognitive radio.
Location awareness is established steps #1 - #5.

TABLE III
FREQUENTLY USED ENVIRONMENTAL CLASSIFICATIONS FOR WIRELESS PROPAGATION WITH SOME RELATED PARAMETERS

| Main | Subclass I | Subclass II | Subclass III | Characteristics | $\tau_{RMS}$ | Mobility |
|---|---|---|---|---|---|---|
| OUTDOOR | Macrocell | Urban | Typical | Large buildings, closely but homogeneously placed houses, thick grown tall trees | 0.5–2μs | High |
| | | | Bad | Inhomogeneous placed buildings and highly dispersive | ≥ 20μs | High |
| | | Suburban | Commercial Residential | Relatively short buildings, scattered trees and some obstacles | 0.3–2μs | High |
| | | | Suburban Residential | Short and closely spaced buildings | 0.3–2μs | High |
| | | Rural | Open | Generally flat, few and widely separated buildings | 0.08–0.14μs | High |
| | | | Forest | Generally flat, few and widely separated buildings, dense tree texture | 0.08–0.14μs | High |
| | | Hilly Terrain | Hilly terrain | Moderate-to-heavy tree densities | 2.8–5.2μs | High |
| | | | Mostly Flat | Moderate-to-heavy tree densities, or hilly terrain with light tree densities | 0.26–1.25μs | High |
| | | | Flat | Flat terrain with light tree density | 0.11–0.2μs | High |
| | | Open | | No obstacles like trees, buildings like farm-lands, fields, etc. | ≤ 0.2μs | High |
| | Microcell | Street Microcell (Dense teletraffic) | | Linear streets, stadiums, parking lots, etc. | 10–100ns | Low |
| | | Suburban Microcell | | Last connection step to wired network | 10–100ns | Low |
| INDOOR | Picocell | Dense | | Small rooms; typically an office where each employee has one's own room; mostly NLOS | 30–60ns | Low |
| | | Open | | Large rooms; typically an office where one room is shared by several employees; mostly LOS or Obstructed-LOS (OLOS) conditions | 100–200ns | Low |
| | | Large | | Environments consisting of very large rooms; typically a factory hall, shopping center or airport building; mostly LOS or OLOS conditions | 100–200ns | Low |
| | | Corridor | | Transmitter and receiver along the same corridor; LOS condition | Up to 300ns | Low |

*FIG. 5*

SYSTEM AND METHOD OF EXPLOITING LOCATION AWARENESS TO IMPROVE WIRELESS COGNITIVE RADIO

CROSS-REFERENCE TO RELATED APPLICATIONS

This application is a Continuation-in-Part of currently pending U.S. Patent Application No. 12/018,481, entitled "System and Method of Exploiting Location Awareness to Improve Wireless System Cognitive Radio", filed on Jan. 23, 2008, which claims priority to U.S. Provisional Patent Application No. 60/886,180, entitled "Methods of Exploiting Location Awareness Towards Improved Wireless System Design in Cognitive Radio", filed on Jan. 23, 2007.

FIELD OF INVENTION

This invention relates to software defined radios and cognitive radios. More specifically, this invention relates systems and associated methods of improving the performance and efficiency of adaptive wireless communication devices including software defined radio and cognitive radio.

BACKGROUND OF THE INVENTION

With the advances in digital technology, sizes of the digital devices decrease while their processing power increases. As a consequence, the newer digital devices are more powerful and even smaller compared to the older ones. By taking advantage of this shrinkage in size and exploiting the increase in processing power, communications companies are able to design a single mobile device which has several add-on functions for different purposes. For instance, currently, it is very easy to find a personal digital assistant (PDA) that has wireless communication capability in addition to its main purpose, which is computation. In parallel, almost all contemporary mobile phones have non-wireless applications (such as a digital camera). Currently, there are mobile devices in which Infra-red Data association (IrDA), Bluetooth, local area network (LAN) wireless connectivity options, digital camera, and Global Positioning System (GPS) are embedded together.

In spite of this vast variety of wireless and other applications embedded in a single device, it is striking that the functions, which have the ability to provide extremely important information to each other, operate independently. This lack of cooperation stems from the fact that there is no unit which can control, coordinate, and interpret the data obtained from different functions. However, with the emergence of cognitive radio (CR), this lack of cooperation can be removed.

As an emerging technology, CR receives significant attention from both academia and industry. Nevertheless, there is no formal definition of CR on which everybody agrees. However, distinct features of CR, which are sensing, being aware of, learning, and adapting to its surrounding environment, allow us to describe it coarsely. Built on software-defined radio (SDR), CR is able to employ these features in its adaptation cycle with the aid of several sensors (e.g. GPS, light, and temperature sensors) and tools used in artificial intelligence (AI) applications (e.g. neural networks, hidden Markov models (HMMs), genetic algorithms. Naturally, the adaptation cycle requires a complete control and coordination of these features.

Rapid advances in digital technology allow people to have a single wireless device that has multiple functions such as communication, computing and entertainment. Currently, the functions operate independently of each other, since there is not unit which controls and coordinates the add-on hardware.

Accordingly, what is needed in the art is a system and method that takes advantage of each wireless device to improve communication in a cognitive radio wireless communication system.

SUMMARY OF INVENTION

The present invention introduces a special unit, referred to as a "cognitive engine", to control and coordinate the tasks of the wireless devices. The cognitive engine carries out these tasks by obtaining all available information from the sources such as sensors, protocol layers, a policy engine, and its own hardware. Next, the cognitive engine interprets, reasons and makes the optimum decision to adapt.

In accordance with the present invention, location awareness is exploited to improve the wireless communication system design in CR. More explicitly, it is emphasized that given the environmental knowledge, a CR that has only an absolute location determination capability (by means of GPS or cellular) improves the performance of its communication via optimizing the system parameters and controlling the interference.

In accordance with an embodiment of the present invention, a method of exploiting location awareness to improve communication performance in a wireless cognitive radio system is provided. In the present embodiment, the system has at least one cognitive radio capable of obtaining its location information and at least one cognitive radio incapable of obtaining its location information. The method includes, determining he absolute position information for the at least one cognitive radio capable of obtaining its location information, receiving digital topographical data related to the absolute position information, classifying the environment of the cognitive radio system based on the absolute position and the topographical data, matching the classified environment with corresponding statistical parameters to identify propagation characteristics of the system, disseminating the propagation characteristics of the system to the at least one cognitive radio incapable of obtaining its own location information and improving the communication performance of the cognitive radio system by adapting the at least one cognitive radio capable of obtaining its location information and the at least one cognitive radio incapable of obtaining its own location information according to the propagation characteristics.

In an additional embodiment of the present invention, a system for exploiting location awareness to improve communication performance in a wireless cognitive radio system is provided. The system includes at least one cognitive radio capable of obtaining its location information having a location sensor to determine the absolute position information for the cognitive radio system capable of obtaining it's location information, at least one cognitive radio incapable of obtaining its location information, a topographical database to provide digital topographical data related to the absolute position information for the cognitive radio system capable of obtaining its location information, a cognitive engine to classifying the environment of the cognitive radio system based on the absolute position for the at least one cognitive radio capable of obtaining its location information and the topographical data, and to match the classified environment with corresponding statistical parameters to identify propagation characteristics of the system and an information dissemination protocol to disseminate the propagation characteristics of the system to the at least one cognitive radio incapable of obtaining its own location information.

As such, the present invention provides a novel way of extracting major wireless channel statistics through absolute location information and digital topographical data. The adaptive wireless systems such as software defined radio, on which cognitive radio is built, use these parameters to adjust their transmission parameters accordingly to improve their performances.

This invention provides new ways of improving the performance and efficiency of adaptive wireless communication devices including software defined radio and cognitive radio. In this invention, new methods to improve the performance of adaptive and cognitive radio communication systems are developed. We propose extracting major wireless channel statistics from the physical environment in the presence of absolute position information and digital topographical data. Once the transceivers have the major channel statistics, they easily adjust their transmission parameters accordingly and with this they improve their performance.

BRIEF DESCRIPTION OF THE DRAWINGS

For a fuller understanding of the invention, reference should be made to the following detailed description, taken in connection with the accompanying drawings, in which:

FIG. 1 is a table illustrating the impact of environmental characteristics on small-scale parameters according to the present invention.

FIG. 2 is a table illustrating some crucial wireless transmission parameters, their impacts, and related adaptation options according to the present invention.

FIG. 5 is a table illustrating frequently used environmental classifications for wireless propagation with some related parameters according to the present invention.

DETAILED DESCRIPTION OF THE PREFERRED EMBODIMENT

Figure 3:
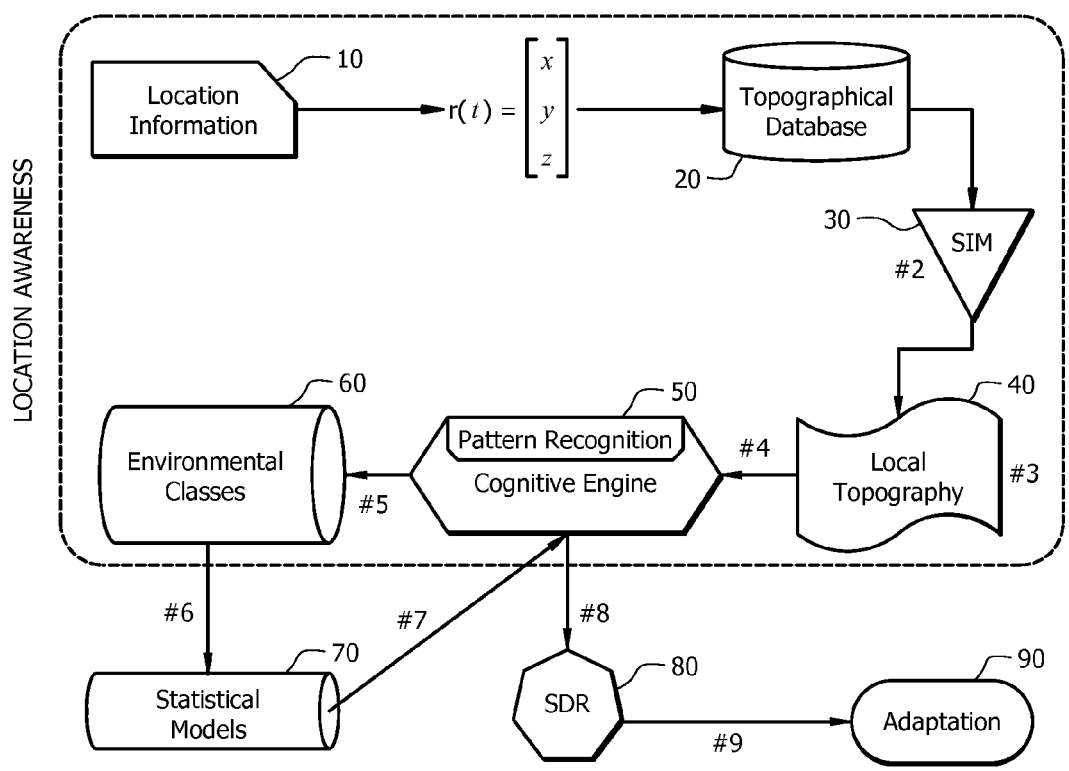
FIG. 3 is an illustration of the environmental classification algorithm for cognitive radio.

The most important aspects of improving the wireless transmission are: (1) to be aware of the radio channel and (2) to change the parameters of the system accordingly. A transmitted signal reaches the receiver after passing through various distortions depending on the transmitted waveform structure and the environment as a result of the propagation characteristics of the electromagnetic waves. Traditionally, the effects of the wireless channel on the transmitted signal are classified as: (I) large-scale effects and (II) small-scale effects. Large-scale effects determine path-loss. Small-scale effects focus on the drastic variations of the received signal strength for short displacements, which are on the order of a few wavelengths of the transmitted signal. These drastic changes in the signal are caused by the multipath phenomenon and variation of the wireless channel in time, due to mobility. Small-scale effects manifest themselves within three different parameters: (i) delay spread, (ii) Doppler spread, and (iii) angular spread. Delay spread arises from the arrival of different multipaths at different delays at the receiver. Doppler spread occurs when the wireless channel changes in time because of the mobility of the user and/or transmitter and/or relative motion of the objects within the environment. Angular spread is a measure of how multipaths concentrate about a specific direction. Each form of small-scale effect introduces a different aspect of the wireless channel Delay spread is used to describe the time dispersion of the channel. In connection with the notion of coherence bandwidth, it is related to the frequency selectivity of the channel Typical values of delay spread of indoor mobile radio channels differ from that of outdoor radio channels. Furthermore, outdoor environments that have different terrain and building structures exhibit different delay spread characteristics. The typical root-mean-square (RMS) delay spread values for urban areas are on the order of microseconds, whereas those of suburban areas are on the order of nanoseconds. The channel shapes (power delay profiles) of these environments differ from each other, too.

Doppler spread is the measure of the broadening of the signal in the frequency domain due to temporal variation of the channel The temporal variation of the channel is quantified by coherence time and it is inversely proportional to the Doppler spread. Thus, the larger the Doppler spread, the narrower the coherence time interval, and the faster the channel changes. It is also known that the slower the mobile, the narrower the Doppler spectrum. Therefore, it is easily deduced that for the environments in which mobility is limited (e.g. inside the buildings), the Doppler spectrum is more likely to be narrow. Conversely, for the environments in which the mobility is not limited (e.g. rural areas), it is expected that the Doppler spectrum is wide.

For angular spread, the effect of multipaths is examined from the perspective of their angle of arrival. The amount of spreading is directly related to the amount of scattering in the environment. The richer the scattering environment, the more the spread is experienced in the angle domain In addition, the larger the angular spread, the lower the correlation becomes between antenna elements. For indoor communications, one might anticipate that the angular spread is larger than that for outdoor because of the presence of numerous scatterers. With the same reasoning, it is possible to find different angular spread behaviors within different scenarios among outdoor radio environment sub-classes. For instance, in an environment which can be identified as open rural area, the angular spread is expected to be narrower than that in an area which is identified as urban.

The impact of environmental characteristics on small-scale parameters discussed up until this point is presented in Table I of FIG. 1.

Apart from small-scale parameters, there are some crucial parameters for further description of the wireless channel In almost every wireless radio technology standard, the relevant channel models are classified through one very important distinction: (1) being in line-of-sight (LOS) or (2) non-line-of-sight (NLOS). It is known that for every kind of radio transmission, LOS channels differ from NLOS channels because of the presence of the direct path. This fact along with several other effects sometimes requires a special design structure in wireless communication systems such as in 10-66 GHz portion of the physical layer part of IEEE 802.16.

Noise must also be taken into account in realistic wireless channel models, since the impact of noise on the communication system is obvious. Generally, because of its mathematical tractability, noise is assumed white and chosen as Gaussian distributed, which has a flat power spectrum. However, it has been reported that offices, factories, hospitals have impulsive noise rather than white and Gaussian distributed as well as do some outdoor environments, due to man-made noise sources. Furthermore, it is shown that maximal ratio combining, equal gain combining, and selection diversity are not effective in impulsive noise environments. Hence, being aware of the type of noise is of crucial importance in adjusting some of the system parameters such as coding requirements.

Aforementioned propagation related parameters, their effects, and adaptation options (in the case of having a priori knowledge about them) are tabulated in Table II of FIG. 2.

In the literature, there are two methods to model the radio propagation: (a) stochastic method and (b) deterministic method. In the stochastic method, field measurements are made with an extensive amount of work to characterize the wireless channel. Fields in which the measurements are made are classified based on their topographical properties. In the deterministic method, numerical calculations (such as ray-tracing methods) are employed to attain the desired wireless channel parameters with ultimate pinpoint accuracy. The major differences between the stochastic method and the deterministic method are that, the stochastic method allows for use of simple formulas which are valid for general cases (due to stochastic structure), whereas the deterministic method provides pinpoint accuracy for a specific case at the expense of computationally complex processes.

Considering the fact that the stochastic method is faster and can provide solutions for general scenarios, compared to the deterministic method, the stochastic method is considered more appropriate for CR at this stage. However, employing the stochastic method requires a CR to have the topographical information about the geographical area. Some of the basic topographical databases such as digital elevation models (DEMs) (i.e. digital representations of topographic surfaces, which are used for determining properties of terrain in terms of elevation at any point, slope, aspect and extracting features of it, such as peaks and pits and other landforms) are known in wireless communications for similar purposes such as determining if a line-of-sight exists between a transmitter-receiver pair. Digital elevation models are easy to be processed digital data which can give some hints to a CR about the attributes of the surrounding environment via spatial interpolation methods (SIMs). Also, a Geographical Information System (GIS) provides comprehensive topographical information which can be queried by GPS. Thus, when the cognitive engine is provided with a sort of topographical information such as DEM or GIS, it can recognize the pattern of the aerial information, locate the appropriate class, and match the most appropriate statistics out of its memory.

The present invention introduces a special unit, referred to as a "cognitive engine", to control and coordinate the tasks of the wireless devices. The cognitive engine carries out these tasks by obtaining all available information from the sources such as sensors, protocol layers, a policy engine, and its own hardware. Next, the cognitive engine interprets, reasons and makes the optimum decision to adapt. FIG. 3 illustrates a conceptual model for CR within this context.

With reference to FIG. 3, the flow of the environmental classification for cognitive radio in accordance with the present invention is illustrated. As shown in FIG. 3, spatial interpolation methods 30 utilize location information 10, along with data from a topographical database 20, to give some hints to a CR about the attributes of the surrounding environment. A Geographical Information System can them be used to provide comprehensive local topographical information 40 to a Cognitive Engine 50 that is able to recognize the pattern of the aerial information, locate the appropriate class 60 and then match the most appropriate statistics out of its memory 70. In combination with software-defined radio 80, the cognitive radio can then perform adaptation 90 to the environment.

Figure 4:
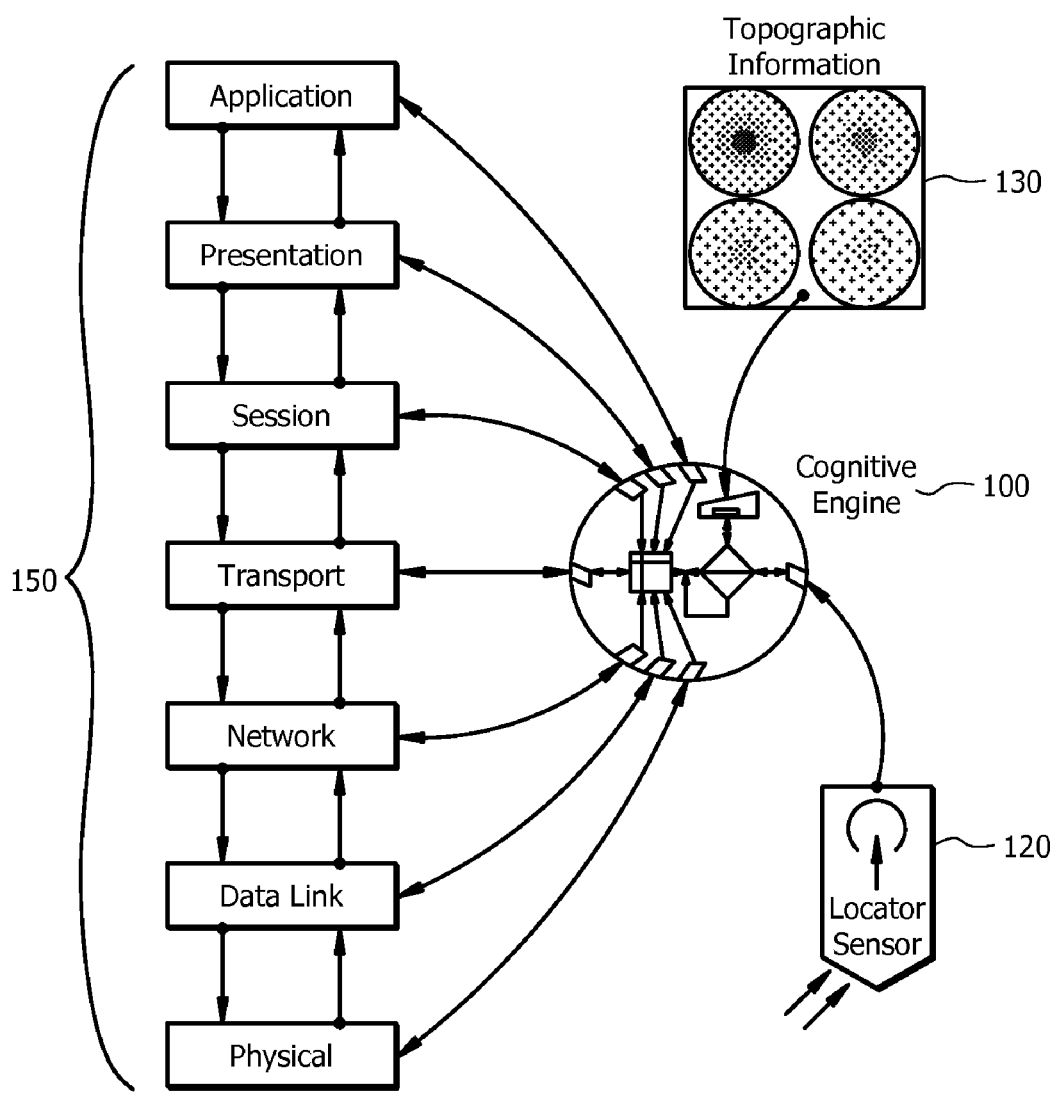
FIG. 4 is an illustration of a conceptual model of a cognitive radio including a location sensor in accordance with the present invention.

With reference to FIG. 4, throughout the adaptation cycle, in each step, cognitive engine 100 needs to evaluate some independent data fed by its sensors and/or layers 150 within several different contexts to attain its goal. In FIG. 4 this is illustrated for a location sensor 120 providing an independent input to the cognitive engine 100 in addition to topographical information 130 fed by another source. Cognitive engine 100 must interpret this independent input as data that contains a geographical collection. On the other hand, topographical data must be interpreted in such a way that it contains some sort of terrain structures relevant to the physical environment. In other words, cognitive engine must be context-aware in terms of the input fed. In order for cognitive radio to "understand" its position within the topographical information given, cognitive engine needs to combine these two independent contextual information elements intelligently. Since the information feed is independent in terms of their sources and structures, cognitive engine has to deduce the relation between them through context-awareness. Next, cognitive engine needs to classify its environment relative to its position to be able to find out the appropriate statistics. This requires the statistics to be represented in a hierarchical fashion, so the matching procedure can be established seamlessly. Since statistics are sets that are composed of subsets such as presented above, cognitive engine needs to infer the necessary subsets of the statistics through the environmental classification deduced. With the help of Table 1, cognitive engine decides the necessary changes and employs them easily in the relevant layer of the protocol stack. Meanwhile, one can claim that the framework must be established in such a way that modifications of the existing structures and/or installations of new ones should not be cumbersome or experiencing incompatibility with already existing ones, either. Hence, all this flow requires a special mechanism that has the capability of representing hierarchical data to access, enabling the properties of semantics (computer processable meaning) to reason through context-awareness, and being reconfigured easily for the future.

The first step for CR in exploiting the location awareness is to classify its environment according to a chart which is similar to the one presented in Table III of FIG. 5. This is very important since classification facilitates storing and searching for appropriate statistical models that correspond to the environments in which CR operates. Moreover, a structure such as presented in Table III can easily be expanded for new environments that might be defined in the future. In order to attain the organized structure mentioned here, having the ability to represent the data in a hierarchical way is essential.

In addition to representing the data in a hierarchical way, CR also gets information from various sources (as shown in FIG. 4) such as sensors, protocol layers, external devices, and even its own hardware. Even though the pieces of information obtained are coming from independent sources, some of them can be related. Consider the case in which CR has light and temperature sensors along with GPS. If a contextual connection can be established between the bits of information provided by these sources in a combined fashion such that "all of them provide information related to the surrounding environment," CR can make use of them in exploiting the location awareness. It is clear that the contextual relation is not limited to the sensors. Relationships between sensors and other types of sources may exist too. For instance, GPS information is related to location-aware routing applications over a network layer. However, this sort of connection is not possible unless the context of the information is included. This requirement leads to an abstraction, which is known as a Knowledge Representation System (KRS).

In order for a CR to represent the data in a hierarchical and contextual form, the "KRS" concept has been put forward. A KRS represents the universe of a CR and consists of numerous subspaces such as space, time, user, the radio itself, spectrum, network and their subspaces such as environment, air interfaces, protocol layers, and so on. It is very difficult to document all possible subspaces in the universe of reasoning, even though it is not favorable since a radio, which is able to interpret as many things as possible, is desired, when it is needed (for instance, due to insufficient memory, the necessity of deletion of some subspaces such as old standards which have never been used), it can be shrunk as well. As a matter of fact, this flexibility is a requirement, since a CR is considered to have a dynamic library that can be updated easily when environments, policies, needs, etc. change.

Solely the construction of KRS will not be enough for a CR to exploit location awareness. Besides KRS, a tool for processing KRS must be present as well. Radio Knowledge Representative Language (RKRL) has been proposed filing the gap in processing KRS. Therefore, RKRL can be defined as "a formal structure that helps CR to process the hierarchical and contextual construction, which is KRS."

RKRL consists of statements and each statement forms a special structure called "frame." Frames express the relationship between their contents in a particular context. The ontological structure of the universe of a CR, the hardware in a CR, and the environment in which a CR operates are only a few examples that can be defined and described by the frame structure. For instance, the ontological structure of the universe of a CR might be of the form:

● <Universe>
▶ <Solar system>
▶ <Earth> (1)
▶ {<Space>, <Time>, <User>, <Radio>,... }, Where <æ> denotes a contextual set that might contain several subsets; æ represents the set of everything; ▶denotes one of the subsets of its superset.

Following the same pattern (1), CR can represent the "space" in detail as:

...
▶ <Space>
▶ {<Position>, <Temperature>, ... }.

As such, CR can easily represent the "sensors" as::

...
▶ <Radio>
▶ <Sensors>
▶ {<GPS>, <Heat>, <Light>, ... }.

Similarly, the "position" which is denoted with <Position> in KRS, can be represented with the following subset:

{<r>, <Environment>, <Direction>, ... },

Where <r> denotes the coordinate triple, which is of the form <r>=<[x,y,z]>.

Note that this hierarchical representation quantifies what a CR can be aware of. For example, a CR which solely has GPS, will shrink its <Sensors> subset and define it by only {<GPS>}.

Once the hierarchical structure is formed, attaching the corresponding contexts to the sources can be investigated. For example, the context of a sensor, say GPS, can be defined in the following mapping manner:

[<GPS>=<Space>×<Time>↦<s>],

Where <Space>×<Time> represents the notion "space-time" and <s> is the space-time quadruple of the form <[r,t]>. With the same reasoning, in the case of using a heat sensor, the context of the sensor can be shown in the following form:

[<Heat>=<Space>×<Time>↦T],

Where T denotes the temperature.

As can be seen, CR is able to recognize each piece of information fed by each sensor with the aid of the context. Furthermore, CR can even find the connection with other <Space> and/or <Time> related entities in its universe by just looking at the context of the sensor of interest. For instance, the domains of both <GPS> and <Heat> (i.e. the left hand side of ↦) contain <Space> and <Time> together. Therefore, it is deduced that <GPS> and <Heat> produce related information. Note that once the contexts and rules are established in a logic programming language, in RKRL, the reasoning depends solely on querying the relationship. Thus, with the aid of RKRL, CR can find every context that is related to another one in its KRS.

It has been discussed that environmental classification carries a crucial importance for CR. Having a classification such as in Table III of FIG. 5 in hand, representing the classification is straightforward by following the pattern in (1). As an example, CR can express "open rural area", which will be a subset of <Environment>, as follows:

...
▶ <OUTDOOR>
▶ <Rural>
▶ <Open>.

In this sequel, relating empirical models with corresponding environmental classes can be considered. Recall that RKRL can process every entity that belongs to the universe of CR with the aid of frames. Hence, propagation models are nothing but a collection of frames for CR. Because different environmental classes require different path-loss models, it is appropriate to represent relevant models as subsets of the classes to which they belong. For instance, path-loss for a rural area can be of the form:

...
▶ <Rural>
▶ <Path-Loss Model>
▶ <Hata's Model>,

Wherein, Hata's model is based on already widely used models. Similar to path-loss, other important propagation statistics such as power delay profile (PDP), Doppler spread, etc. can also be represented in this manner. For example, PDP can be represented in such a way that it includes number of clusters, number of taps in each cluster, relative power, RMS delay spread, and so on.

As a final step, after matching operation, it is sufficient for CR only to ready the values from the statistical model "frame" and apply them to relevant transmission parameters accordingly. Some of the options that CR can adapt after adjusting its parameters in connection with the propagation characteristics of the environment are presented in Table II of FIG. 4.

Up to this point, the use of information about propagation environment from the perspective of individual CRs has been discussed. However, the dissemination of this information in a network that consists of multiple CRs is very important as well. The main urge behind disseminating this information is to make other CRs, which do not have the capability of obtaining this information on their own because of lack of necessary sensors and/or insufficient resources, be aware of the characteristics of the environment. For the sake of brevity, $CR_o$ is used representing CRs that do not have the capability of obtaining the information on their own and $CR_1$ is used for the capable ones. Sharing this information improves several aspects of the network while also assisting CRs in adjusting their parameters in an optimum manner for individual adaptation.

The dissemination of the information can be considered in two ways depending upon the architecture of the network: (1) centralized or (2) decentralized. In a centralized network, $CR_0$ requests the propagation characteristics from the center. If the center is of type $CR_1$, it forms the data with the aid of RKRL and forwards it to $CR_0$. $CR_0$ interprets this structural data and employs the necessary changes accordingly. In the case where the center is not of type $CR_1$, then $CR_1$ broadcasts the location information of $CR_0$ to other nodes (which may be established by using a pre-defined control channel) and in response, an available $CR_1$ sends the relevant information back to the center to be dispatched to CR0. On the other hand, in a decentralized network, $CR_0$ solely broadcasts its request for location information and waits for $CR_1$s to respond back with the data processed by RKRL.

Once CR obtains the propagation characteristics, it adapts its parameters accordingly. Of course, this individual adaptation of CR leads to several improvements in the network as well. Path-loss adaptation can be used in power-control algorithms in code division multiple access (CDMA) based networks. Hence, the average amount of interference experienced by other uses is reduced, which increases the network capacity. In an orthogonal frequency division multiplexing (OFDM) based network, adjusting the cyclic prefix (CP) size accordingly rather than setting it to the worst-case scenario will improve the spectral efficiency. In the case where the cyclic prefix size is lower than that for the worst-case, the overall data rate will increase as well. There are numerous ways of exploiting the propagation characteristics in terms of adaptation apart from the ones mentioned here. Some of the crucial parameters and corresponding adaptation options are presented in Table II of FIG. 2.

It is known in the art that contemporary wireless communications systems utilize some of the adaptation options mentioned in Table II of FIG. 2. However, there are differences between how contemporary wireless communication systems and CR quantify important propagation characteristics. In contemporary wireless communication systems, path-loss is measured from the samples of received signal strength (RSS). Based upon the measured RSS and a threshold value, the link quality is evaluated and adaptation is established. In order to estimate the delay spread, contemporary communication systems employ channel frequency correlation estimates as well as level crossing rate (LCR) of the channel in the frequency domain. Depending upon the estimated value, adaptive channel equalization is applied. Doppler spread estimation is carried out in current wireless communication systems too. Correlation and variation of the channel estimates (or signal envelope) are prominent methods in estimating the Doppler spread. Doppler spread information is used in radio network control algorithms such as cell assignment and channel allocation in cellular systems.

However, even though current wireless communication systems are able to measure the major propagation parameters and use them for adaptation, they do have any other option except to utilize the received signal to make these parameters measurements. Utilizing the received signal can be referred to as "internal sensing". In contrast, CR system are not limited to internal sensing, and are capable of utilizing external sensing, being aware of, learning and adapting to its surrounding environment. As such, CR systems are capable of taking advantage of these recently emerging sensing opportunities to better estimate the propagation parameters with the aid of cognitive engine, which leads to improvement in overall system performance. Additionally, these recently emerging sensing opportunities can provide CRs with novel awareness and adaptation options that cannot be achieved by internal sensing. For instance, being aware of the user is one of the prominent awareness and adaptation options, which includes the users identify, perception, and preferences as well as the characteristics of the user's surrounding environment (e.g. physical location, illumination, ambient acoustic noise, etc.). The information that is obtained by this sorts of sensing can be very useful to improve the network and service performance. However, the use of this type of information is only possible when the sensing data is processed by RKRL. Cognitive engine cannot determine the context of the sensing data unless RKRL, or another appropriate language, forms the context. The traditional strictly layered protocol architecture causes the contemporary wireless devices (and therefore the systems) to perform in a sub-optimal range. On the other hand, the presence of cognitive engine along with external sensing capabilities allows CR systems to achieve cross-layer adaptation and optimization as shown in FIG. 4. CR systems are able to perform in the optimum range by incorporating the bits of information coming from external sensing into the cognition cycle with the aid of RKRL.

Cognitive radio can be aware of many concepts via internal and/or external sensing.

Particularly in the case of location, each concept to be aware of has different projections or impact on different layers in the protocol stack. These protections define two very important relationships. The first relationship is between the layers and each other, since the projections are caused by the same concept. In accordance with the present invention, it is seen that the concept of "location" has an impact on almost every layer. This relationship between layers allows a CR to consider the projections jointly and leads to cross-layer adaptation and optimization. The second relationship is between the concept itself and its projections. As such, specific locations cause specific effects. This second relationship provides a sort of mapping or function in a mathematical perspective so that CR can either examine (or evaluate, or measure) the projections to be aware of the concept, or be aware of the concept first and then exploit the corresponding projections in terms of cross-layer adaptation and optimization. Considering the increasing trend that allows people to define more relationships by incorporating more sensors on devices, along with increased processing power, the cognition cycle can be extended to attain the ultimate cognitive radio.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described, In the claims:

1. A method of exploiting location awareness to improve communication performance in a wireless cognitive radio system, the system having at least one cognitive radio capable of obtaining its location information and at least one cognitive radio incapable of obtaining its own location information and incapable of having its location information determined by the at least one cognitive radio capable of obtaining its location information, the method comprising:

determining absolute position information for the at least one cognitive radio capable of obtaining its location information;

receiving digital topographical data related to the absolute position information;

classifying the environment of the cognitive radio system based on the absolute position and the topographical data;

matching the classified environment with corresponding statistical parameters to identify propagation characteristics of the system;

disseminating the propagation characteristics of the system to the at least one cognitive radio incapable of obtaining its own location information and incapable of having its location information determined by the at least one cognitive radio capable of obtaining its location information; and improving the communication performance of the cognitive radio system by adapting the at least one cognitive radio capable of obtaining its location information and the at least one cognitive radio incapable of obtaining its own location information and incapable of having its location information determined by the at least one cognitive radio capable of obtaining its location information according to the propagation characteristics.

2. The method of claim 1, wherein determining the absolute position information for the at least one cognitive radio capable of obtaining its location information further comprises determining the absolute position information using a global positioning system technology.

3. The method of claim 1, wherein receiving digital topographical data further comprises receiving digital topographical data using digital elevation models.

4. The method of claim 1, wherein the cognitive radio system is a centralized cognitive radio system and disseminating the propagation characteristics to the at least one cognitive radio incapable of obtaining its own location information in the centralized cognitive radio system further comprises, the at least one cognitive radio incapable of obtaining its own location information requesting the propagation characteristics from a center cognitive radio of the centralized cognitive radio system.

5. The method of claim 4, wherein the center cognitive radio of the centralized cognitive radio system is capable of obtaining its own location information and wherein disseminating the propagation characteristics to the at least one cognitive radio incapable of obtaining its own location information further comprises, the center cognitive radio forwarding the propagation characteristics to the at least one cognitive radio incapable of obtaining its own location information.

6. The method of claim 4, wherein the center cognitive radio of the centralized cognitive radio system is incapable of obtaining its own location information and wherein disseminating the propagation characteristics to the at least one cognitive radio incapable of obtaining its own location information further comprises, the center cognitive radio broadcasting the location information of the at least one cognitive radio incapable of obtaining its own location information to at least one other cognitive radio in the system capable of obtaining its own location information, receiving the propagation characteristics from the at least one other cognitive radio at the center cognitive radio and the center cognitive radio forwarding the propagation characteristics to the at least one cognitive radio incapable of obtaining its own location information.

7. The method of claim 1, wherein the cognitive radio system is a decentralized cognitive radio system and disseminating the propagation characteristics to the at least one cognitive radio incapable of obtaining its own location information in the decentralized cognitive radio system further comprises, the at least one cognitive radio incapable of obtaining its own location information broadcasting it's a request for location information and waiting for at least one other cognitive radio capable of obtaining its own location information to respond with the propagation characteristics.

8. The method of claim 1, wherein the environment classification is selected from the group consisting of urban, suburban, rural, hilly terrain, open, street, dense, large, corridor, outdoor, indoor, macrocell, microcell and picocell.

9. The method of claim 1, wherein the statistical parameters are selected from the group consisting of path-loss, delay spread, Doppler spread, angular spread, line-of-sight, non-line-of-sight and noise characteristics.

10. The method of claim 1, wherein disseminating the propagation characteristics of the system to the at least one cognitive radio incapable of obtaining its own location information method further comprises, disseminating the propagation characteristics utilizing an information dissemination protocol.

11. The method of claim 10, wherein the information dissemination protocol is Radio Knowledge Representation Language (RKRL).

12. The method of claim 1, wherein improving the communication performance of the cognitive radio system by adapting the at least one cognitive radio capable of obtaining its location information and the at least one cognitive radio incapable of obtaining its own location information according to the propagation characteristics further comprises, adapting the at least one cognitive radio capable of obtaining its location information and the at least one cognitive radio incapable of obtaining its own location information through empirical models.

13. A system for exploiting location awareness to improve communication performance in a wireless cognitive radio system, the system comprising at least one cognitive radio capable of obtaining its location information having a location sensor to determine the absolute position information for the cognitive radio system capable of obtaining it's its location information;

at least one cognitive radio incapable of obtaining its location information and incapable of having its location information determined by the at least one cognitive radio capable of obtaining its location information;

a topographical database to provide digital topographical data related to the absolute position information for the cognitive radio system capable of obtaining its location information;

a cognitive engine to classifying the environment of the cognitive radio system based on the absolute position for the at least one cognitive radio capable of obtaining its location information and the topographical data, and to match the classified environment with corresponding statistical parameters to identify propagation characteristics of the system; and an information dissemination protocol to disseminate the propagation characteristics of the system to the at least one cognitive radio incapable of obtaining its own location information and incapable of having its location information determined by the at least one cognitive radio capable of obtaining its location information.

14. The system of claim 13, wherein the location sensor is a global positioning system technology sensor.

15. The system of claim 13, wherein the topographical database uses digital elevation models.

16. The system of claim 13, wherein the environment classification is selected from the group consisting of urban, suburban, rural, hilly terrain, open, street, dense, large, corridor, outdoor, indoor, macrocell, microcell and picocell.

17. The system of claim 13, wherein the statistical parameters are selected from the group consisting of path-loss, delay spread, Doppler spread, angular spread, line-of-sight, non-line-of-sight and noise characteristics.

18. The system of claim 13, wherein the at least one cognitive radio incapable of obtaining its own location information is adapted according to the corresponding statistical parameters utilizing empirical models.

19. The method of claim 13, wherein the information dissemination protocol is Radio Knowledge Representation Language (RKRL).

* * * * *